United States Patent
Griffin, Jr. et al.

(10) Patent No.: US 9,079,452 B2
(45) Date of Patent: Jul. 14, 2015

(54) DECORATIVE LAMINATE AND METHOD FOR MANUFACTURING SAME

(71) Applicant: Wilsonart LLC, Temple, TX (US)

(72) Inventors: Charles M. Griffin, Jr., Cameron, TX (US); Robert R. Krebs, Georgetown, TX (US)

(73) Assignee: WILSONART LLC, Temple, TX (US)

( * ) Notice: Subject to any disclaimer, the term of this patent is extended or adjusted under 35 U.S.C. 154(b) by 0 days.

(21) Appl. No.: 14/100,906

(22) Filed: Dec. 9, 2013

(65) Prior Publication Data

US 2014/0162031 A1    Jun. 12, 2014

Related U.S. Application Data

(60) Provisional application No. 61/735,202, filed on Dec. 10, 2012.

(51) Int. Cl.
*B32B 3/00* (2006.01)
*B44C 5/04* (2006.01)
*B32B 21/06* (2006.01)

(52) U.S. Cl.
CPC ............ *B44C 5/0469* (2013.01); *B32B 21/06* (2013.01); *Y10T 428/24802* (2015.01); *Y10T 428/24851* (2015.01)

(58) Field of Classification Search
CPC .. B32B 21/06; B32B 2260/28; B32B 2260/46
See application file for complete search history.

(56) References Cited

U.S. PATENT DOCUMENTS

| | | | |
|---|---|---|---|
| 1,871,702 A | 8/1932 | Kallander et al. | |
| 2,207,122 A | 7/1940 | Hayward | |
| 4,006,048 A * | 2/1977 | Cannady et al. | 156/90 |
| 4,476,193 A | 10/1984 | Seidel et al. | |
| 2006/0157195 A1 * | 7/2006 | Laurence et al. | 156/307.1 |
| 2012/0107608 A1 | 5/2012 | Krebs et al. | |

FOREIGN PATENT DOCUMENTS

| | | |
|---|---|---|
| EP | 0021588 | 1/1981 |
| EP | 0993941 | 4/2000 |
| WO | WO2012061196 | 5/2012 |

\* cited by examiner

*Primary Examiner* — Elizabeth Mulvaney
(74) *Attorney, Agent, or Firm* — Welsh Flaxman & Gitler LLC

(57) ABSTRACT

A decorative laminate includes a decorative layer composed of a resin impregnated decorative sheet and a core layer composed of plural resin impregnated core sheets of core paper, wherein an exposed sheet at a bottom of the decorative laminate is subjected to a parchment treatment.

16 Claims, 2 Drawing Sheets

DECORATIVE LAMINATE AND METHOD FOR MANUFACTURING SAME

CROSS REFERENCE TO RELATED APPLICATION

This application claims the benefit of U.S. Provisional Application Ser. No. 61/735,202, entitled "DECORATIVE LAMINATE AND METHOD FOR MANUFACTURING SAME," filed Dec. 10, 2012.

FIELD OF THE INVENTION

The invention relates to a resin impregnated decorative laminate and method for manufacturing same.

BACKGROUND

Decorative laminates are generally constructed from plural layers of synthetic resin impregnated paper sheets bonded under heat and pressure to form a unitary structure. With regard to the manufacture of high pressure laminates, the decorative laminate sheet assembly includes at least a core of one or more phenol formaldehyde resin impregnated sheets and a melamine impregnated decorative sheet. The decorative sheet may be further covered with a transparent melamine impregnated overlay layer.

The decorative sheet provides the laminate with an attractive appearance. The decorative sheet, and the overlay layer, dictate the surface characteristics of the decorative laminate. For example, the composition of the decorative sheet and overlay layer dictates the decorative laminate's resistance to chemical agents, heat, light, impact and abrasion.

Decorative sheets are commonly manufactured from high quality 60-205 grams/meter$^2$, pigment filled, alpha cellulose paper impregnated with a water alcohol or water solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a roto-gravure reproduction of natural materials, such as, wood, marble, leather, abstract design, etc. The aesthetic characteristics of the cellulose paper are revealed as the laminate's decorative design upon completion of the manufacture of the decorative laminate.

The core, or base, functions to impart rigidity and impact resistance to the laminate. Prior to stacking, the paper sheets of the core are impregnated with a water alcohol or water solution of phenol formaldehyde resin, dried and partially cured in a hot oven. The cured laminate is then cut into predetermined shapes used to assemble the laminate layer. The core may, for example, include a plurality of sheets of 160 to 550 grams/meter$^2$ basis weight Kraft paper, impregnated with phenol formaldehyde resin, wherein the phenol formaldehyde resin is generally 25% to 35% of the final weight of the impregnated or coated core sheet. The Kraft paper is impregnated throughout and bonded with a substantially cured phenol formaldehyde resin which has been converted to a thermoset state during the initial laminating step.

A solid substrate may be bonded to the laminate where additional rigidity is required. Substrates are generally composed of a pre-cured plastic laminate, such as glass fiber-reinforced thermoset polyester resin laminates and the like; a wood product, such as hardboard, wood waste or particle boards, plywood and the like; a mineral base board, such as, cement-asbestos board, sheet rock, plaster board, and the like; or a combination of substrates. The substrate is commonly applied to the phenol formaldehyde resin impregnated sheets making, up the core only after the laminate lay-up is pressed and heated to form the final decorative laminate.

Decorative laminates are generally manufactured by stacking the resin impregnated core sheets, the decorative sheet and the overlay layer to form a laminate sheet assembly, or laminate lay-up. The laminate lay-up is placed between steel press plates and subjected to temperatures in the range of about 121° C.-160° C., preferably 131° C., and pressure of about 56.24 kg/cm$^2$-112.48 kg/cm$^2$, preferably 85 kg/cm$^2$ for a time sufficient to consolidate the laminate and cure the resins (generally about 25 minutes to an hour). The pressure and heat force the resin in the paper sheets to flow, cure and consolidate the sheets into a unitary laminated mass referred to in the art as a high pressure decorative laminate. Finally, the formed decorative laminate is bonded to a reinforcing substrate, such as, plywood, hardboard, asbestos board, particle board or the like.

Multiple laminate lay-ups are commonly pressed at the same time. When the laminate lay-ups are stacked, care must be taken to ensure that the laminate sheet assemblies do not stick together after the application of heat and pressure. Where the bottom sides of the laminate lay-ups are positioned in a facing relationship during the application of heat and pressure, a release agent is commonly applied to the bottom sheets of the laminate lay-ups such that the bottom sheets do not stick together and may be readily separated after the application of heat and pressure. Thereafter, the bottom layer of resulting decorative laminate must be sanded to remove the release agent before the decorative laminate may be adhesively bonded to a substrate. Consequently, the use of these release agents adds expense and processing time to the manufacture of decorative laminates.

SUMMARY OF THE INVENTION

It is, therefore, an object of the present invention to provide a decorative laminate including a decorative layer composed of a resin impregnated decorative sheet and a core layer composed of plural resin impregnated core sheets of core paper. An exposed sheet at the bottom of the decorative laminate is subjected to a parchment treatment.

It is also an object of the present invention to provide a decorative laminate wherein the plural resin impregnated core sheets are impregnated with phenol formaldehyde resin.

It is another object of the present invention to provide a decorative laminate including an overlay paper layer positioned on top of the decorative layer.

It is a further object of the present invention to provide a decorative laminate wherein the overlay paper layer is preferably a melamine impregnated paper layer.

It is also an object of the present invention to provide a decorative laminate wherein the decorative sheet is 60-205 grams/meter$^2$, pigment filled, alpha cellulose paper impregnated with a water alcohol or water solution of melamine-formaldehyde resin.

It is another object of the present invention to provide a decorative laminate wherein the core layer is composed of an upper first resin impregnated core sheet of Kraft paper and a bottom second resin impregnated core sheet of Kraft paper.

It is a further object of the present invention to provide a decorative laminate wherein the first and second resin impregnated core sheets are 160-550 grams/meter$^2$ resin impregnated Kraft paper.

It is also an object of the present invention to provide a decorative laminate wherein the upper first resin impregnated core sheet is impregnated with a phenol formaldehyde resin composition and is partially cured.

It is another object of the present invention to provide a decorative laminate wherein the upper first resin impregnated core sheet is impregnated with phenol formaldehyde resin such that the phenol formaldehyde resin is 25% to 35% of a final weight of the upper first resin impregnated core sheet.

It is a further object of the present invention to provide a decorative laminate wherein the bottom second resin impregnated core sheet is subjected to a parchment treatment.

It is also an object of the present invention to provide a decorative laminate wherein the bottom second resin impregnated core sheet is preferably 160 to 550 grams/meter$^2$ basis weight Kraft paper.

It is another object of the present invention to provide a decorative laminate wherein the bottom second resin impregnated core sheet is subjected to the parchment treatment prior to being impregnated with resin.

It is a further object of the present invention to provide a decorative laminate wherein the bottom second resin impregnated core sheet includes a first side and second side, and the second side is a lower surface that is ultimately exposed and bonded to a substrate.

It is also an object of the present invention to provide a decorative laminate wherein the second side is subjected to a parchment treatment.

It is another object of the present invention to provide a decorative laminate wherein the parchment treatment is achieved using sulfuric acid.

It is a further object of the present invention to provide a laminate lay-up comprising a decorative layer composed of a resin impregnated decorative sheet and a core layer composed of plural resin impregnated core sheets of core paper. An exposed sheet at the bottom of the decorative laminate is subjected to a parchment treatment.

Other objects and advantages of the present invention will become apparent from the following detailed description when viewed in conjunction with the accompanying drawings, which set forth certain embodiments of the invention.

DETAILED DESCRIPTION

Figure 1:
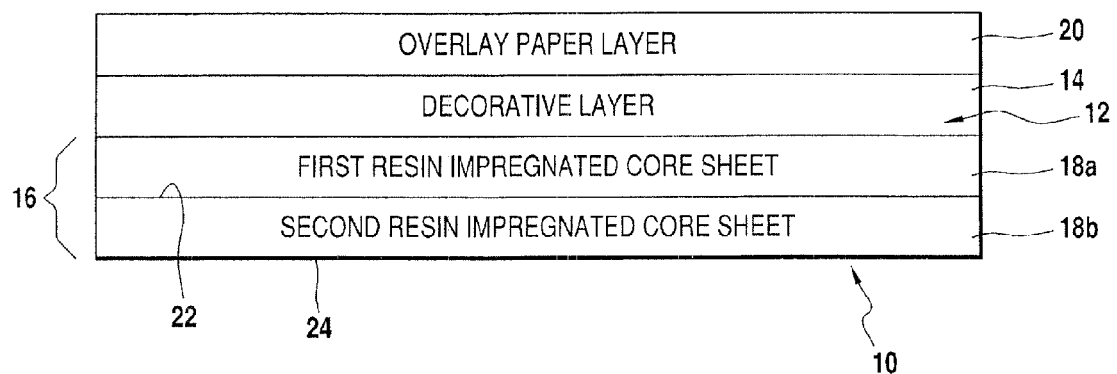
FIG. 1 is a schematic of the decorative laminate in accordance with one embodiment of the present disclosure.

Referring now to the drawings, an embodiment of the high pressure decorative laminate 10 disclosed herein is illustrated in FIG. 1. It should be appreciated that the illustrated embodiment is merely an example. Therefore, the details disclosed herein are not to be interpreted as limiting, but merely as a basis for teaching one skilled in the art how to make and/or use the decorative laminate of the present disclosure.

Briefly, and as will be described in greater detail below, the decorative laminate 10 includes a decorative layer 12 and a core layer 16. The decorative layer 12 is composed of a resin impregnated decorative sheet 14. The core layer 16 is composed of plural resin impregnated sheets of core paper 18a and 18b (sometimes referred to herein as "resin impregnated core sheet"), which is impregnated with phenol formaldehyde resin. As will be explained below in greater detail, the lowermost resin impregnated core sheet 18b, that is, the exposed sheet at the bottom of the decorative laminate 10 is subjected to a parchment treatment. The decorative laminate 10 is manufactured by first preparing the resin impregnated decorative sheet 14 and the resin impregnated core sheets 18a, 18b. As shown with reference to FIG. 3, the resin impregnated decorative sheet 14 and resin impregnated core sheet 18 are layered to form a laminate lay-up 30a, 30b and the laminate lay-up is heated and pressed to consolidate and cure the laminate 10.

In accordance with an embodiment of the present disclosure, the high pressure decorative laminate 10 includes an overlay paper layer 20, a decorative layer 12, and a phenol formaldehyde resin core layer 16 composed of two resin impregnated core sheets 18a, 18b. It should be appreciated, however, that the layering pattern may be varied, somewhat, without departing from the spirit of the present disclosure.

The overlay paper layer 20 is preferably a melamine impregnated paper layer. The overlay paper layer 20 is preferably manufactured from a low basis weight transparent sheet impregnated with resin, for example, melamine. The resin impregnated overlay paper layer 20 is subsequently dried, partially cured and finally cut into sheets. While the paper may exhibit opaque properties prior to heating and pressing, the overlay paper layer 20 in the final fabricated laminate is preferably transparent to permit viewing of the decorative sheet 14 positioned directly beneath the overlay paper layer 20.

The decorative layer 12 is composed of a conventional decorative sheet 14 positioned directly beneath the overlay paper layer 20. When the laminate is fully heated and pressed, as will be discussed in detail below, the overlay paper layer 20 becomes translucent, fully exposing the decorative layer 12. The decorative layer 12 is chosen from a wide array of sheets. For example, the decorative layer 12 may be a solid color (for example, white) or may include an aesthetically appealing pattern.

The overlay paper layer 20 and the decorative layer 12 also dictate the surface characteristics of the final decorative laminate 10. For example, the composition of the overlay paper layer 20 and decorative layer 12 dictate the decorative laminate's resistance to chemical agents, heat, light, shock and abrasion.

As discussed above, the decorative layer 12 is composed of a sheet of decorative paper 14. The decorative sheets are commonly manufactured from high quality 60-205 grams/meter$^2$, pigment filled, alpha cellulose paper impregnated with a water alcohol or water solution of melamine-formaldehyde resin. The decorative paper 14, in accordance with an embodiment of the present disclosure, is impregnated with a resin content of approximately 50% or greater. The resin impregnated decorative sheets 14 are subsequently dried, partially cured, and finally cut into sheets. The pigment filled, alpha cellulose paper of the decorative sheet may include a solid color, a decorative design, or a roto-gravure reproduction of natural materials, such as, wood, marble, leather, etc. The aesthetic characteristics of the cellulose paper are revealed as the laminate's decorative design upon completion of the decorative laminate 10.

The core layer 16 is preferably composed of first and second resin impregnated sheets of Kraft (or core) paper 18a, 18b although other materials, and volume of sheets, may be used without departing from the spirit of the present disclosure. For example, the core layer 16 includes two sheets of 160-550 grams/meter$^2$ resin impregnated Kraft paper 18a, 18b. The Kraft paper of the upper first resin impregnated core sheet 18a is processed in a traditional manner and is, therefore, impregnated with a phenol formaldehyde resin composition and is partially cured (β-staged). In accordance with a preferred embodiment, the upper first resin impregnated core sheet 18a is impregnated with phenol formaldehyde resin such that the phenol formaldehyde resin is generally 25% to 35% of the final weight of the impregnated or coated core sheet.

With regard to the bottom second first resin impregnated core sheet 18b, the Kraft paper is preferably 160 to 550 grams/meter$^2$ basis weight Kraft paper. However, and before the Kraft paper is impregnated with phenol formaldehyde resin, the Kraft paper of the bottom second resin impregnated core sheet 18b is subject to a parchment treatment.

Figure 2:
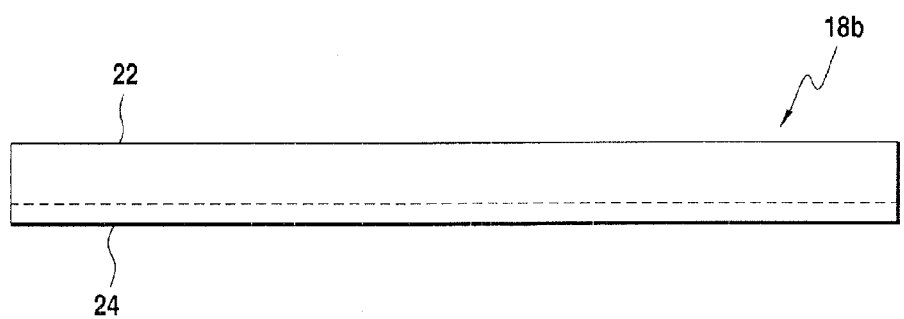
FIG. 2 is a detailed schematic of the bottom second resin impregnated core sheet of the decorative laminate disclosed in FIG. 1.

In particular, and with reference to FIG. 2, the Kraft paper from which the bottom second resin impregnated core sheet 18b includes a first side 22 and second side 24. The first side 22 is the upper surface that will be in a facing relationship with the upper first resin impregnated core sheet 18a, and the second side 24 is the lower surface that will ultimately be exposed and bonded to a substrate after manufacture of the decorative laminate 10. As such, the second side 24 is subjected to a parchment treatment using sulfuric acid. In particular, second side 24 is subjected to sulfuric acid which hydrolyses and solubilizes the cellulose present in the pulp wood fibers of the Kraft paper. The paper web is then washed in water, which stops the hydrolysis of the cellulose and causes a kind of cellulose coating to form. The paper may then be dried.

More particularly, and in accordance with a preferred embodiment, a treatment composition of sulfuric acid ($H_2SO_4$) at a concentration to 64% to 74% is prepared (in solution with water ($H_2O$). It is appreciated the treatment composition of sulfuric acid is preferably prepared by adding highly concentrated $H_2SO_4$ (for example, a solution of 98% $H_2SO_4$) to water with stirring until a desired concentration is achieved. The second side 24 of the bottom second resin impregnated core sheet 18b is brushed with the sulfuric acid composition. Immediately after the sulfuric acid composition is applied to the second side 24 of the bottom second resin impregnated core sheet 18b the bottom second resin impregnated core sheet 18b is subjected to pressure using a pressure roller. Thereafter, the bottom second resin impregnated core sheet 18b is submerged in a water bath and then again subjected to pressure using a pressure roller. Finally, the sulfuric acid is neutralized by submerging the bottom second resin impregnated core sheet 18b in a bath of neutralizing agent composed of a 30% concentration of ammonium hydroxide ($NH_4OH$) (in solution with water ($H_2O$) and once again subjected to pressure using a pressure roller. It is appreciated the neutralizing agent of a 30% concentration of ammonium hydroxide is preferably prepared by adding highly concentrated ammonium hydroxide to water with stirring until a desired concentration is achieved. Without this neutralization step any sulfuric acid remaining in the paper causes a rapid degradation of the paper; the paper turns black and loses structural strength. The bottom second resin impregnated core sheet 18b is then dried and ready for the application of phenol formaldehyde resin to the first side 22 thereof. In accordance with a preferred embodiment, the Kraft paper is dried in an oven. This drying process removes water and also removes any ammonia retained in the paper. When the dried paper is removed from the oven it does not smell of ammonia. Residual ammonia would change the curing kinetics of the subsequent impregnation with phenolic resin.

The bottom second resin impregnated core sheet 18b resulting from the parchment process described above shows excellent water holdout characteristics and release characteristics. In addition, cross sections were done to determine the depth of the parchment on the Kraft paper with results showing a thickness of 0.04 mm-0.06 mm along the second side 24 being parched by way of the parchment process described above. This accounts for 0.04 mm-0.06 mm out of a total thickness of 0.5 mm for the Kraft paper making up the bottom second resin impregnated core sheet 18b.

It is appreciated that although the sulfuric acid composition was applied using a brushing technique in the process described above, the steps outlined above may be achieved using line processes (for example, rollers and baths) commonly employed in the laminate industry. It is further appreciated, the present treatment process works well with standard Kraft paper (such as 100% virgin fiber, 100% recycled fiber, or a combination of virgin and recycled fibers; 100% virgin newsprint, 100% recycled newsprint, or a combination of virgin fiber and recycled fiber) used in the high pressure decorative laminate industry (for example, saturated grade Kraft paper as would be used in the preparing of the upper first resin impregnated core sheet 18a.

After parchment treatment, the first side 22 of the bottom second resin impregnated core sheet 18b is impregnated with phenol formaldehyde resin in a traditional manner. As a result of the parchment treatment, a barrier is formed along the second side 24 of the bottom second resin impregnated core sheet 18b preventing resin from adjacent laminate lay-ups for intermixing and bonding adjacent laminate together. Because the second side 24 retains many of the characteristics of untreated resin impregnated Kraft paper, the bottom surface, that is, the second side 24 of the second resin impregnated core sheet 18b, of the formed laminate 10 will still adhere to various substrates using the same adhesives that are traditionally used. However, and contrary to previous practice, it is not necessary to sand the second side of the bottom second resin impregnated core sheet. The advantage to using the parchment treatment for facilitating release between the bottom core sheets of adjacent laminate lay-ups is that it eliminates the sanding process needed remove release agents and the resulting laminates will still adhere using the same adhesives that would be used on sanded laminate. This eliminates the energy required for sanding, the application of the release agents and the time needed for sanding.

Figure 3:
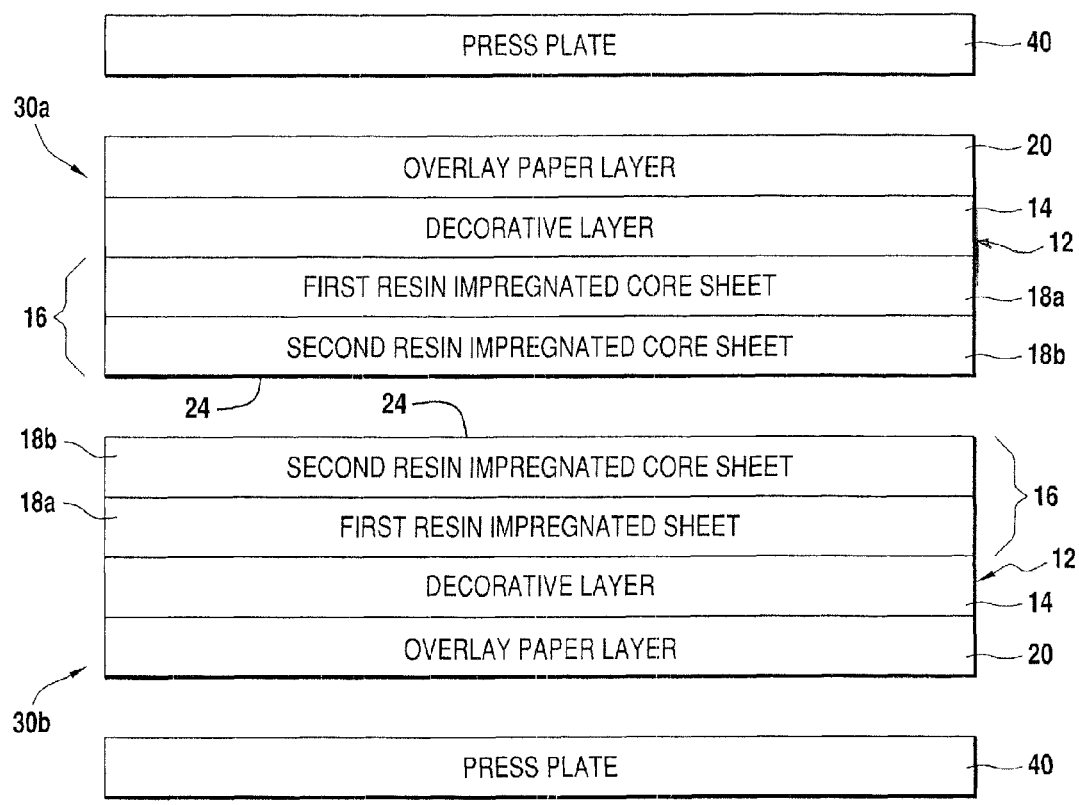
FIG. 3 is a schematic of the stacking and manufacturing process employed in accordance with the present invention.

Once the appropriate layers of the laminate are formed, the sheets 14, 18a, 18b, 20 are stacked in a conventional manner (with the bottom second resin impregnated core sheet 18b at the bottom of the laminate lay-up and the second side 24 of the bottom second resin impregnated core sheet 18b facing the outwardly away from the remainder of the laminate lay-up. As shown in FIG. 3, a first laminate lay-up 30a stacked as described above is then stacked with a second laminate lay-up 30b stacked as described above with the second sides 24 of the bottom second resin impregnated core sheets 18b positioned in a facing relationship. The first and second laminate lay-ups 30a, 30b are then between steel press plates 40 with the overlay sheets 20 of the respective first laminate lay-up 30a and the second laminate lay-up 30b in direct contact with the steel press plates 40. The laminate stacks are then subjected to temperatures in the range of 121° C.-160° C., preferably 131° C., and pressure of about 56.24 kg/cm$^2$-112.48 kg/cm$^2$, preferably 85 kg/cm$^2$ for a time sufficient to consolidate the laminate and cure the resins (generally about 25 minutes to an hour). The laminates are then cooled for approximately 10 minutes under pressure before it is ready for further processing in preparation for its use in the manufacture of various products.

While specific temperatures, pressures and times are described above, it should be appreciated that a variety of pressing techniques may be used without departing from the spirit of the present disclosure.

The pressure and heat force the resin in the paper sheets to flow, cure and consolidate the sheets into a unitary laminated mass referred to in the art as a decorative high pressure laminate. Generally, more than one laminate is formed at one time.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by appended claims.

The invention claimed is:

1. A decorative laminate, comprising:
a decorative layer composed of a resin impregnated decorative sheet; and
a core layer composed of an upper first resin impregnated core sheet of Kraft paper and a bottom second resin impregnated core sheet of Kraft paper,
wherein the bottom second resin impregnated core sheet is subjected to a parchment treatment such that an exposed sheet at a bottom of the decorative laminate is subjected to a parchment treatment.

2. The decorative laminate according to claim 1, wherein the upper first resin impregnated core sheet of Kraft paper and the bottom second resin impregnated core sheet of Kraft paper are impregnated with phenol formaldehyde resin.

3. The decorative laminate according to claim 1, further including an overlay paper layer positioned on top of the decorative layer.

4. The decorative laminate according to claim 3, wherein the overlay paper layer is preferably a melamine impregnated paper layer.

5. The decorative laminate according to claim 1, wherein the decorative sheet is 60-205 grams/meter$^2$, pigment filled, alpha cellulose paper impregnated with a water alcohol or water solution of melamine-formaldehyde resin.

6. The decorative laminate according to claim 1, wherein the first and second resin impregnated core sheets are 160-550 grams/meter$^2$ resin impregnated Kraft paper.

7. The decorative laminate according to claim 1, wherein the upper first resin impregnated core sheet is impregnated with a phenol formaldehyde resin composition and is partially cured.

8. The decorative laminate according to claim 7, wherein the upper first resin impregnated core sheet is impregnated with phenol formaldehyde resin such that the phenol formaldehyde resin is 25% to 35% of a final weight of the upper first resin impregnated core sheet.

9. The decorative laminate according to claim 1, wherein the bottom second resin impregnated core sheet is 160 to 550 grams/meter$^2$ basis weight Kraft paper.

10. The decorative laminate according to claim 1, wherein the bottom second resin impregnated core sheet is subjected to the parchment treatment prior to being impregnated with resin.

11. The decorative laminate according to claim 10, wherein the bottom second resin impregnated core sheet includes a first side and second side, and the second side is a lower surface that is ultimately exposed and bonded to a substrate.

12. The decorative laminate according to claim 11, wherein the second side is subjected to a parchment treatment.

13. The decorative laminate according to claim 12, wherein the parchment treatment is achieved using sulfuric acid.

14. A laminate lay-up, comprising:
a decorative layer composed of a resin impregnated decorative sheet; and
a core layer composed of an upper first resin impregnated core sheet of Kraft paper and a bottom second resin impregnated core sheet of Kraft paper,
wherein the bottom second resin impregnated core sheet is subjected to a parchment treatment such that an exposed sheet at a bottom of the decorative laminate is subjected to a parchment treatment.

15. The laminate lay-up according to claim 14, wherein the bottom second resin impregnated core sheet is subjected to the parchment treatment prior to being impregnated with resin.

16. The laminate lay-up according to claim 15, wherein the bottom second resin impregnated core sheet includes a first side and second side, and the second side is a lower surface that is ultimately exposed and bonded to a substrate, and wherein the second side is subjected to a parchment treatment.

* * * * *